United States Patent
Yeap et al.

(10) Patent No.: US 7,707,558 B2
(45) Date of Patent: Apr. 27, 2010

(54) OPERATING SYSTEM LOADER MODIFICATION

(75) Inventors: Yuen-Pin Yeap, Cupertino, CA (US); Paul Daniel Lawrence, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1122 days.

(21) Appl. No.: 11/150,815

(22) Filed: Jun. 10, 2005

(65) Prior Publication Data

US 2006/0282827 A1    Dec. 14, 2006

(51) Int. Cl.
G06F 9/44    (2006.01)
G06F 12/16    (2006.01)

(52) U.S. Cl. .................. 717/130; 717/127; 717/131; 726/24; 726/25

(58) Field of Classification Search .................. 717/127
See application file for complete search history.

(56) References Cited

U.S. PATENT DOCUMENTS

| | | | | |
|---|---|---|---|---|
| 5,964,839 | A * | 10/1999 | Johnson et al. | 709/224 |
| 6,012,082 | A * | 1/2000 | Kar | 718/107 |
| 6,189,142 | B1 * | 2/2001 | Johnston et al. | 717/125 |
| 6,629,109 | B1 * | 9/2003 | Koshisaka | 707/203 |
| 6,658,600 | B1 * | 12/2003 | Hogdal et al. | 714/33 |
| 6,662,359 | B1 * | 12/2003 | Berry et al. | 717/130 |
| 6,820,176 | B2 * | 11/2004 | Heisch | 711/152 |
| 6,823,460 | B1 * | 11/2004 | Hollander et al. | 726/3 |
| 7,111,307 | B1 * | 9/2006 | Wang | 719/321 |
| 2002/0099874 | A1 * | 7/2002 | Bonola | 710/1 |
| 2004/0025015 | A1 * | 2/2004 | Satterlee et al. | 713/164 |
| 2004/0243975 | A1 * | 12/2004 | Krueger et al. | 717/106 |

OTHER PUBLICATIONS

WO 00/68790 Nov. 16, 2000 Cohen Nadav.*
"Remus: a security-enhanced operating system", Bernaschi et al., Feb. 2002, pp. 36-61. Online retrieved at <http://delivery.acm.org/10.1145/510000/504911/p36-bernaschi.pdf>.*
"Self-healing mechanisms for kernel system compromises", Ring et al., Jan. 2004, pp. 100-104. Online retrieved at <http://delivery.acm.org/10.1145/1080000/1075425/p100-ring.pdf>.*
"The KaffeOS Java runtime system", Back et al., Jul. 2005, pp. 583-630. Online retrieved at <http://delivery.acm.org/10.1145/1080000/1075383/p583-back.pdf>.*
"Detecting exploit code execution in loadable kernel modules", Xu et al., Dec. 2004, pp. 101-110. Online retrieved at <http://ieeexplore.ieee.org/stamp/arnumber=1377220&isnumber=30059>.*

* cited by examiner

*Primary Examiner*—Tuan Q Dam
*Assistant Examiner*—Thuy Dao
(74) *Attorney, Agent, or Firm*—Gunnison, McKay & Hodgson, L.L.P.; Serge J. Hodgson

(57) ABSTRACT

Systems and methods for computer security are provided. In one implementation, a computer-implemented method is provided. The method includes applying a hook to a kernel of an operating system, monitoring system calls made to the kernel using the hook, and injecting a new entry into a list of files assembled by a loader to create a new process when the hook identifies a create process system call. In another implementation, the method can further include initializing the injected new entry where the injected new entry is operable to examine process files prior to loading, examining the process files, and acting on the process according to a result of the examination.

16 Claims, 3 Drawing Sheets

OPERATING SYSTEM LOADER MODIFICATION

BACKGROUND

The present invention relates to computer security.

Conventional computer systems include an operating system. The operating system is loaded at startup during a boot process. At startup, a first program run is typically a set of instructions stored in the computer's read-only memory ("ROM"). The first program can examine system hardware as part of a power-on self test ("POST") to make sure that all hardware components are functioning properly. The POST typically checks one or more of a processor, a memory, and basic input-output systems ("BIOS") for errors. After completing the POST, other software programs loaded into ROM (sometimes called the BIOS or firmware) can be run to activate one or more of the computer's disk drives. In a conventional computer system, when the computer activates a hard disk drive, a first piece of the operating system is accessed (conventionally referred to as a bootstrap loader).

Typically, the bootstrap loader is a program that can be run to load the operating system. In general, the bootstrap loader loads one or more driver programs that interface with and control one or more of the computer hardware subsystems. The bootstrap loader can also set up divisions of memory for holding the operating system, user information, and applications. Additionally, the bootstrap loader can establish data structures for holding one or more signals, flags, and semaphores that can be used by the operating system to communicate within and between subsystems and applications. Finally, the bootstrap loader can turn over control of the computer to the operating system.

A typical operating system can function to provide an interface for one or more hardware devices (e.g., disks and other I/O devices) to provide an application programmer with an abstract model for programming without knowledge of technical details for each of the hardware devices. The operating system can load and run multiple programs simultaneously and independently of each other. The core component of a conventional operating system is a kernel. The kernel is a piece of software that allows various computer programs access to computer system hardware. The kernel typically provides hardware access through a set of hardware abstractions. The hardware abstractions can be used to hide the complexity of the particular hardware components, and therefore provide a clean and uniform interface for accessing the underlying hardware. Since there can be many programs, and access to the hardware (e.g., a processor) is limited, the kernel can schedule when and how long a program can be able to make use of a piece of hardware. Typically, the operating system runs a program by creating one or more processes. Each process can be controlled and managed by the kernel. The operating system loader creates a new process, for example, in response to a user action (e.g., user selection of an executable file). The loader can then generate a list of files associated with the program. The files on the list can be retrieved from a memory store (e.g., a hard disk drive) and copied to an address space in a main memory (e.g., random access memory ("RAM")). Once gathered, each file of the list of files can be compiled in order to execute the process and therefore run the program.

In some instances, a program can be used to monitor or alter the behavior of other programs or processes. For example, programs such as security software, spyware, and viruses and worms can each act to monitor or affect one or more programs or processes. Viruses and worms, for example, can take over other processes in order to obtain unauthorized privileges. Some programs (e.g., a virus) can be injected into another program without a user's knowledge such that the virus is executed when the process including the virus is run. For example, a target process of a program can make calls to one or more files or libraries (e.g., dynamic link libraries ("DLLs")) in order to obtain unauthorized access to other processes. Therefore, some processes, when executed, can be damaging to a computer system.

SUMMARY

Systems and methods for computer security are provided. In general, in one aspect, a computer-implemented method is provided. The method includes applying a hook to a kernel of an operating system, monitoring system calls made to the kernel using the hook, and injecting a new entry into a list of files assembled by a loader to create a new process when the hook identifies a create process system call.

Advantageous implementations can include one or more of the following features. The method can further include initializing the injected new entry where the injected new entry is operable to examine process files prior to loading. The method can also further include examining the process files and acting on the process according to the result of the examination. The examining of the process files can further include analyzing the process files for security threats and determining which process files are loaded statically. The method can further include terminating the process based on the examination of the process files. Acting on the process can include generating an alert and removing one or more files from the list of process files. Acting on the process can also include inserting one or more API hooks to monitor calls made by the process files. Inserting the new entry can further include copying a file into the list of process files where the file can be a dynamic link library. The dynamic link library can be copied to a position on the list of process files such that the dynamic link library is initialized prior to any process specific code. The inserted file can be perceived by the loader as statically tied to the process.

In general, in one aspect, an apparatus for inserting code into a process is provided. The apparatus includes a loader operable to create one or more processes and a kernel operable to receive a system call to create a new process. The apparatus also includes a hook module operable to create a kernel hook operable to monitor the kernel for incoming system calls.

Advantageous implementations can include one or more of the following features. The kernel hook can monitor the kernel for a create process system call. The hook module can be configured to inject code into the loader in response to a detected create process system call.

In general, in one aspect, a computer program product is provided. The computer program product comprises instructions operable to cause a programmable processor to apply a hook to a kernel of an operating system. The computer program product also includes instructions to monitor system calls made to the kernel using the hook and to inject a new entry into a list of files assembled by a loader to create a new process when the hook identifies a create process system call.

The invention can be implemented to realize one or more of the following advantages. An operating system loader can be modified to insert a hook DLL into a process during initialization. The operating system loader can view the inserted hook DLL as statically linked to the process. The hook DLL can be retrieved along with the files associated with the target process. The hook DLL can be inserted into a DLL dependency tree at a location causing the hook DLL to be loaded prior to any non-system code (e.g., prior to any code specific to the target process) allowing the hook DLL to function at a time in which the process is clean and predictable. The hook DLL can be run in the process environment in order to examine a process prior to the initialization of code that can be harmful to other processes of the computer system. The inserted hook DLL can be used to hook all processes. Once loaded, the hook DLL can examine a process from within the DLL providing a clean method for analyzing files at an early stage. Additionally, by running in the same environment as the process, the hook DLL can easily examine properties of the process and associated files. Because the process is still being created while the hook DLL is loaded, the hook DLL can complete an examination of the files associated with the process without adversely impacting the program's behavior. Thus, hooking a process during initialization can be more stable because process-specific behavior has not begun. Additionally, the hooking results can be more predictable. The process can also be terminated prior to any actual execution of process specific code if the DLL hook detects a threat.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Overview

In one implementation, in order to begin a new process, the operating system includes a loader that gathers necessary files in memory and then compiles the files in order to run the program designated by the process. The loader can be hooked in order to intercept a system call to begin a new process. In one implementation when a request for a new process is intercepted by the hook, a new entry (e.g., a file or other code), can be injected (or otherwise inserted) in the initializing process by adding the new entry to the list of entries for files to be gathered by the loader. In one implementation, the injected new entry describes a file. The file can be initialized by the loader prior to the execution of any non-system code in the list. The file can then be run to perform one or more operations on the process, for example, the code can be a hook DLL that can terminate the process if a threat (e.g., a virus) is identified in the process files prior to execution of the file or files identified as a threat.

System Architecture

Figure 1:
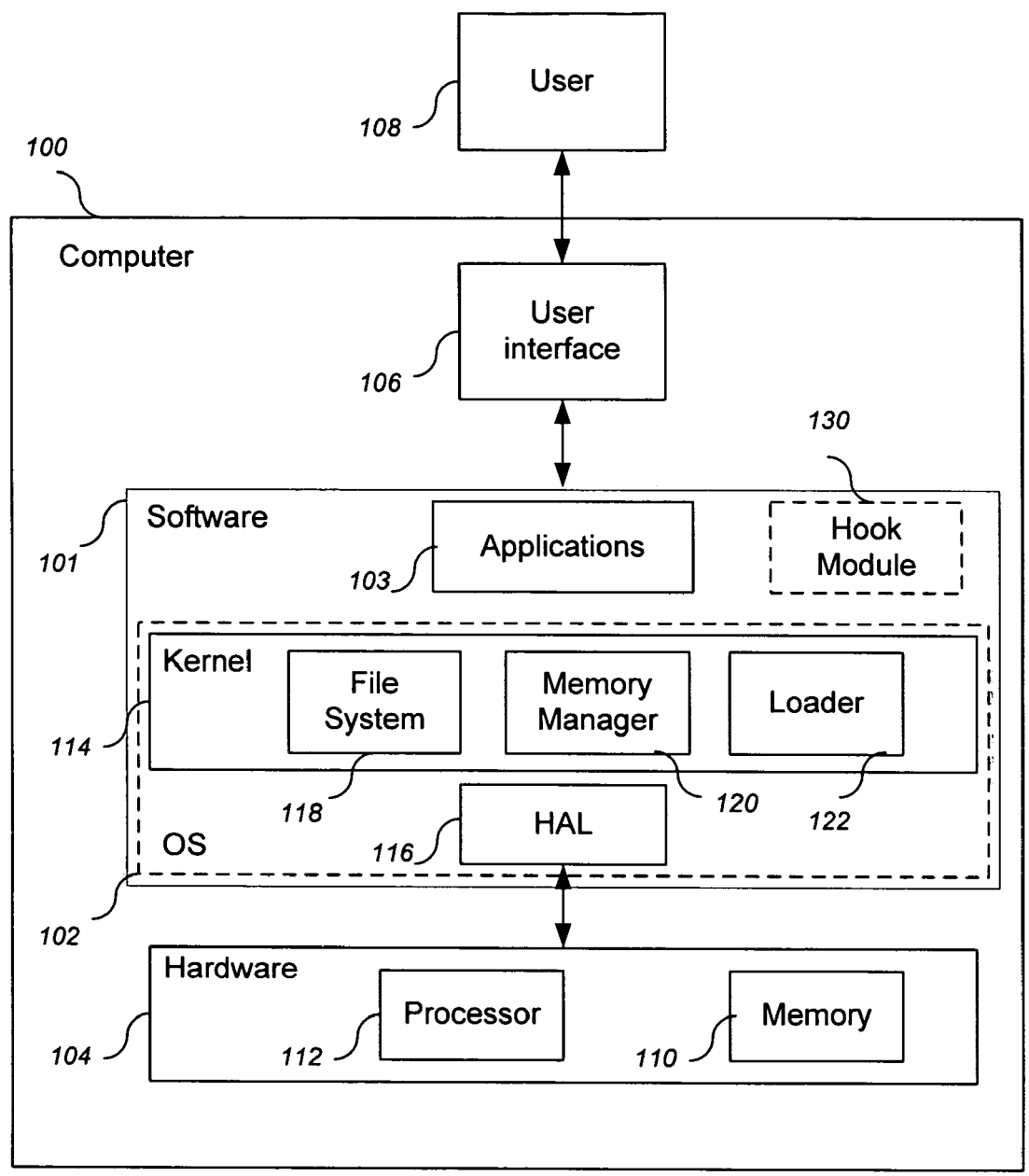
FIG. 1 shows a conceptual block diagram of a computer system.

FIG. 1 shows a conceptual diagram of interacting components of a computer system 100 including an operating system 102. The computer system 100 includes hardware 104, software 101, and a user interface 106. A user 108 can access the computer system 100 through the user interface 106. The hardware 104 includes a memory 110 and a processor 112. The software 101 includes the operating system 102 and applications 103. The operating system 102 includes a kernel 114 and a hardware abstraction layer ("HAL") 116. The kernel 114 includes a file system 118, a memory manager 120, and a loader 122. Software 101 also includes a hook module 130.

The hardware 104 includes the physical devices for operating the computer system 100 and can include storage devices, processing devices, and other input/output devices. The processor 112, for example, a central processing unit, executes instructions retrieved from memory 110. The memory 110 includes storage media for storing data such as hard disk drives and RAM.

The operating system 102 is particular piece of software stored in memory 110. The operating system 102 provides an interface between application programs and the hardware 104. The HAL 116 provides programming that can function as an interface between the hardware 104 and software 101 of the computer system 100 providing a stable hardware platform from which to run one or more programs. With the HAL 116, programs do not access hardware directly but instead access the abstract layer provided by the HAL 116. The HAL 116 allows programs to be device-independent by abstracting information from systems such as caches, I/O buses, and interrupts and using the hardware data to give the software 101 a way to interact with the specific requirements of the hardware 104 on which the program is running.

The operating system 102 also includes the kernel 114, which is the core module of the operating system 102. After being loaded, the kernel 114 remains in main memory 110 or RAM. The kernel 114 can create high level abstractions, in addition to the HAL 116, allowing the operating system 102 to function independent of the hardware 104. The kernel 114 can also provide support for control objects and dispatcher objects. The kernel 114 can also manage processes and threads as well as the interrupts that switch processes or threads. The kernel 114 can include the file system 118, which defines the organizational structure for files within the memory 110. For example, the file structure can be a directory in which each directory entry is one or more files or directories in a tree structure.

The kernel 114 can include a memory manager 120 that prevents multiple programs in memory from interfering with each other. The memory manager also manages address spaces in main memory (e.g., memory 110) for processes to run. The address space for a process is a list of memory locations with some minimum and maximum to which the process can read and write. The kernel 114 includes a loader 122 that can initiate and run a new process. In an alternative implementation, the memory manager 120 and loader 122 can be within the operating system 102 but outside of the kernel 114. For example, in Windows 2000 a memory manager and a process manager operate in an area of the operating system outside the kernel called the executive.

The applications 103 includes one or more programs that can be run on the computer system 100. In one implementation, each program includes an executable file (e.g., a file having an extension of ".exe") that can be operable to cause the operating system 102 to initiate a new process to run the program. In one implementation, in order for the program to obtain the services of the operating system 102, the program makes a system call which causes the kernel 114 to start the operating system 102 and create a new process. In an alternative implementation, for example in one or more Windows operating systems, a program accesses the operating system through a Win32 Application Program Interface ("API"). The Win32 API is a set of procedures used by programmers to access the operating system's services. The API then invokes system calls to the kernel, for example a "CreateProcess" call to initiate a new process.

The hook module 130 can be included within software 101. In one implementation, the hook module 130 can be part of a program in applications 103. In another implementation, the hook module 130 is a component installed into the operating system 102. Alternatively, the hook module 130 can be a software component of a security program or device. The hook module 130 can be used to hook the kernel 114 and to inject an entry into the loader 122 in response to a call for a new process.

The user interface 106 provides interaction between the computer system 100 and the user 108. The user interface 106 can be a graphical user interface or a text based interface. Typical graphical user interfaces include, for example, windows, icons, and pop-up menus displayed on a screen. The user interface 106 can include a set of commands or menus through which the user can communicate with one or more programs.

Injection

Figure 2:
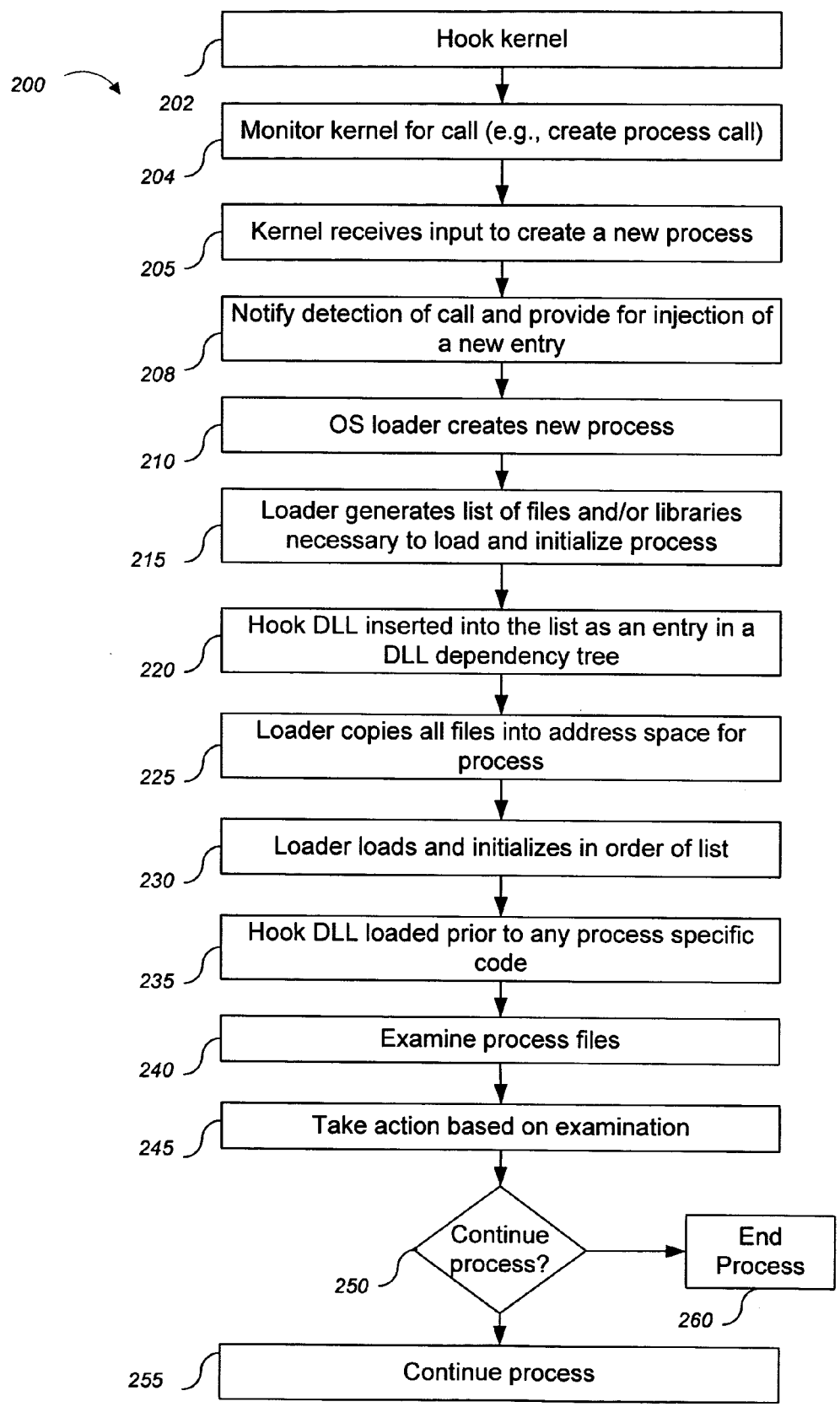
FIG. 2 shows a process for inserting a file into a loading process.

FIG. 2 illustrates a process 200 for injecting a file into a loading process. A hook module (e.g., the hook module 130) can be used to hook the operating system kernel (e.g., the kernel 114) (step 202). A hook can allow a user or program to be able to see what functions are being called in the kernel and how they're being called. Once the kernel is hooked for one or more functions, the hook receives the call instead of the intended target. The hook function can then be used to call the real function or to take some other action upon receiving the call. Hooks can be used to either monitor a system or change a system's behavior.

The kernel hook can be used to monitor the kernel for any incoming calls to begin a new process (step 204). Alternatively, the hook can be configured to monitor only for specific types of new processes. For example, a user can select an executable file that causes the operating system (e.g., operating system 102) to begin a new process. The new process can be used to run a program (e.g., a program from Applications 103) such as a word processor or spreadsheet program. By executing the program, a system call to create a new process can be sent to the kernel (e.g., a "CreateProcess" call) in order to cause the operating system to initiate a new process. Once a call to create a process has been received by the kernel (step 205), the kernel can then direct the operating system to create a new process by causing the loader (e.g., loader 122) to create a new process (step 210). Additionally, upon detection of the call, the kernel hook can notify the hook module that a call (e.g., create process) has been detected and provide for the injection of a file into the process (step 208). In one implementation, the kernel hook provides for an interception of the loader such that the loader can be used to inject the file into the process.

The loader begins by initializing a new process including generating a list of files and/or libraries necessary for the process (step 215). The executable file can include a list of files or libraries needed for the process. For example, the executable file for a notepad program (e.g., notepad.exe) includes a set of files needed to run the process including a DLL dependency list. The DLL dependency list includes all of the DLLs that need to be gathered in order to run the process. Each DLL is a library linking one or more files which can be used to run the program.

While the new process is initializing, the hook module (e.g., hook module 130) has been alerted to the initiation of a new process. After the call is detected, the hook module modifies the loader in order to insert an entry for a particular file into the process. In one implementation, the file is a hook DLL (e.g., hook.dll) added into the DLL dependency list created by the loader for the new process (step 220). In one implementation, the hook DLL is added directly to the existing DLL dependency list. In another implementation, a copy of the DLL dependency list is created, the hook DLL is added to the DLL dependency list, and the pointer to the list is modified to refer to the copied DLL dependency list. The hook DLL can be configured to provide one or more security functions during process loading. In one implementation, the hook DLL is inserted into the DLL dependency list such that the loader sees the hook DLL as one of the files statically bound with the process. Statically bound DLLs must be loaded for the process to be run. The loader then copies the files from the list of process files to an address space in main memory designated for the process (step 225).

After the process files have all been copied, the loader begins to load each file in order to build the process (step 230). In one implementation, the files are loaded sequentially based on the list of files from the executable file. In one implementation, a next file on the list is not processed and loaded until the previous files loading is complete. In one implementation, the first files loaded are system files common to all processes. Following the common system files are files specifically for the given process. In one implementation, the hook DLL can be inserted into the list such that the hook DLL is the first code loaded following the system files (step 235). In one implementation, the hook DLL can be the second file loaded by the loader, after a required system DLL such as kernel32.dll or ntdll.dll.

Once the hook DLL is loaded, the files linked by the hook DLL can be executed to examine the other files in the process list for executing the process. For example, a security analysis can be performed. The hook DLL can examine the listed files, including other DLLs, in order to identify any potential threats (step 240). In one implementation, the files can be examined for viruses or worms which can act to damage the computer when run by the loader. For example, the hook DLL can identify which other DLLs listed for the process are also statically loaded. Because statically loaded files must be loaded for the process to execute, a potential virus or other harmful code can be injected into the program as a statically loaded file in order to ensure activation.

In one implementation the hook DLL can establish one or more particular API hooks to monitor the process. For example, the hooks can be used to monitor and intercept particular API calls made by files during the loading process. A security action can be taken to prevent the API call from reaching the intended target application if a threat is detected. In one implementation, once the hook DLL is loaded, a user can be prompted to input the API hooks to setup. Alternatively, a user can establish a set of hooks and security rules for the hook DLL prior to the initiation of the process. In another implementation, the API hooks can be used to monitor performance of one or more processes to detect program errors.

The hook DLL can take one or more security actions upon identifying one or more threats (e.g., threat files) (step 245). In one implementation, an alert can be generated for a security program or the user identifying the threat and request instructions. In another implementation, the hook DLL can act to remove the threatening file from the process prior to execution. The hook DLL can also determine that the process needs to be terminated in order to prevent the threat (e.g., prevent one or more files from being loaded). Other types of actions in response to an identified threat are possible. For example, in one implementation, the process can be moved to a more restricted environment. In another implementation, a state (e.g., of a security program) can be raised allowing the process to continue under heightened monitoring. For example, additional indicators suggesting a threat can be monitored for and an alert generated if one or more additional indicators are detected. The hook DLL can notify the user and request instructions. In one implementation, additional hooks can be added into the process or a related process to provide further monitoring or protection. Each detected event indicating a potential threat can be logged or recorded in a central process. The above actions can be taken alone or in combination with other actions.

After examining the files for the process, a determination can be made by the hook to continue loading the process or to terminate the process (step 250). For example, if a virus is detected in the list of files, the hook can terminate the process in order to prevent the code associated with the virus from being executed. Thus, the hook can be used as a security device to prevent the execution of harmful code in program processes.

The process can be allowed to continue (step 255). For example, if the examination of the process does not discover any threats, the process can continue to be executed in order to run the target program. In one implementation, a process can be allowed to continue even though a potential threat was detected. A security program can be put into place to further monitor the process through execution in order to detect adverse actions by the process. Alternatively, in another implementation, the file or files identified as a threat can be removed from the process prior to allowing the process to continue. For example, a virus that operates by injecting a DLL file into an executable can be repaired to remove the virus DLL prior to continuing the process loading.

If a determination is made to stop the process, the process can be terminated (step 260). If a process is terminated, an alert or report can be sent to a security device or to the user indicating why the process was terminated. Alternatively, after terminating the process, a security program can be directed to repair the program so that it can be run at a later time.

Alternative Injection Process

In an alternative implementation, the hook DLL can be injected into a process using a particular hook driver. When the hook driver initializes, the driver hooks the kernel at the loader (e.g., loader 122) at a location where a new process space is created (e.g., where a new process is created in response to a call to create a new process such as an "NtCreateProcess" call). The driver also hooks the kernel (e.g., kernel 114) at one or more particular functions (e.g., "NtContinue") used during an execution of a process. For example, the "NtContinue" function call can be made after a debugging of an executable file in order to continue process initialization.

When a new process is detected by the loader hook, a portion of main memory having a size equal to the size of a hook DLL is allocated to a hook DLL and the hook DLL is copied to the memory location. The hook DLL is then initialized when a call is made to one of the other hooked functions. The hook can then perform the process analysis and action as described above, including terminating the process.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
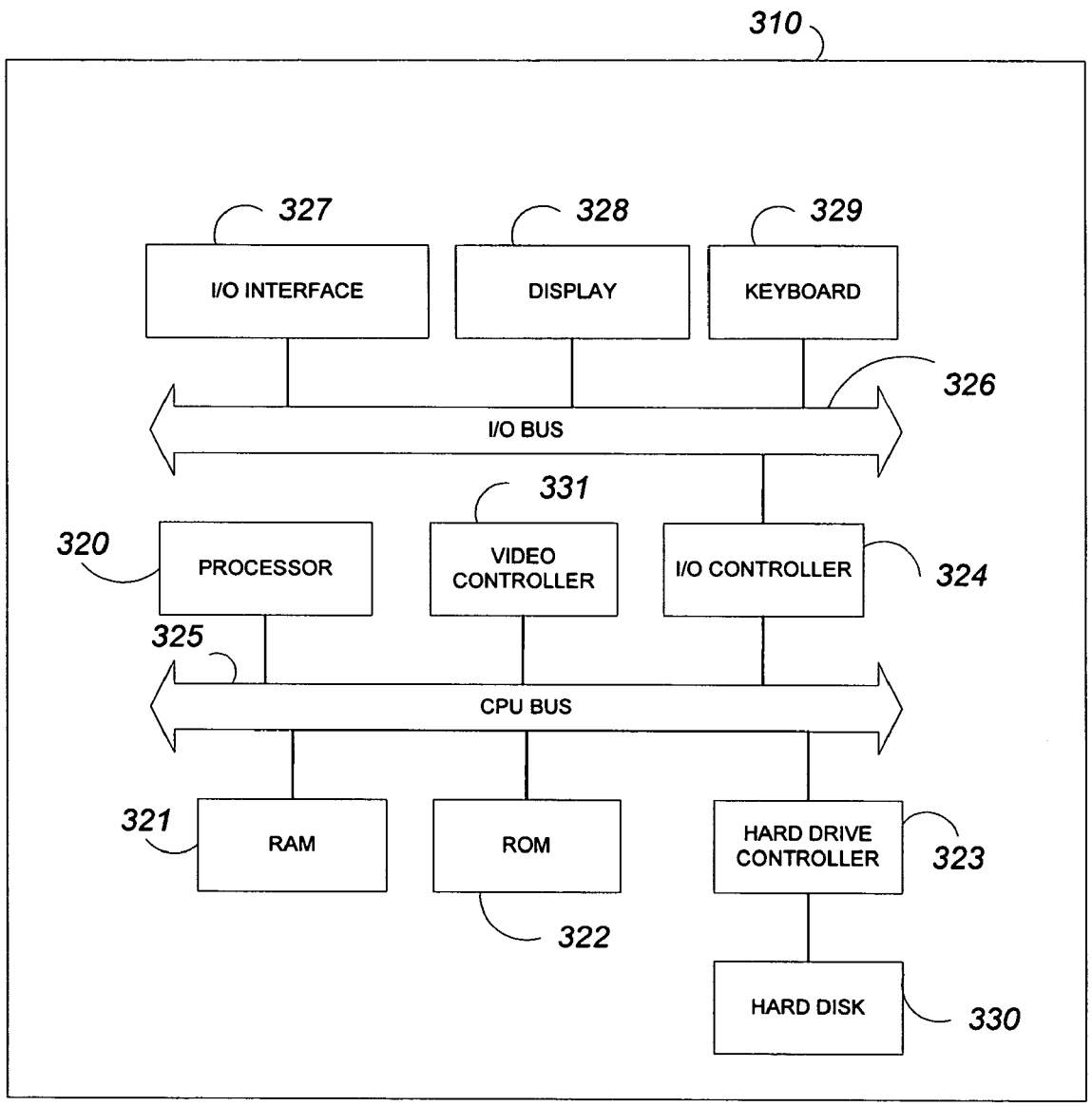
FIG. 3 shows a computer system.

An example of one such type of computer is shown in FIG. 3, which shows a block diagram of a programmable processing system (system) 310 suitable for implementing or performing the apparatus or methods of the invention. The system 310 includes a processor 320, a random access memory (RAM) 321, a program memory 322 (for example, a writable read-only memory (ROM) such as a flash ROM), a hard drive controller 323, a video controller 331, and an input/output (I/O) controller 324 coupled by a processor (CPU) bus 325. The system 310 can be preprogrammed, in ROM, for example, or it can be programmed (and reprogrammed) by loading a program from another source (for example, from a floppy disk, a CD-ROM, or another computer).

The hard drive controller 323 is coupled to a hard disk 330 suitable for storing executable computer programs, including programs embodying the present invention.

The I/O controller 324 is coupled by means of an I/O bus 326 to an I/O interface 327. The I/O interface 327 receives and transmits data (e.g., stills, pictures, movies, and animations for importing into a composition) in analog or digital form over communication links such as a serial link, local area network, wireless link, and parallel link.

Also coupled to the I/O bus 326 is a display 328 and a keyboard 329. Alternatively, separate connections (separate buses) can be used for the I/O interface 327, display 328 and keyboard 329.

The invention has been described in terms of particular embodiments. Other embodiments are within the scope of the following claims. For example, the steps of the above described methods can be performed in a different order and still achieve desirable results.

What is claimed is:

1. A computer-implemented method, comprising:
applying a hook on a kernel of an operating system;
monitoring system calls made to the kernel using the hook;
identifying a create process system call to create a new process using the hook, wherein upon receipt of the create process system call by the kernel, a loader of the operating system is directed to create the new process comprising:
assembling a list of files to be loaded for the new process, the list of files comprising:
system files common to all processes; and
process specific files specific to the new process;
injecting a new entry into the list of files assembled by the loader to create the new process comprising copying a new file into the list of files such that the copied new file will be loaded prior to loading of the process specific files;
loading the copied new file prior to the loading of the process specific files, wherein upon being loaded, the copied new file is operable to examine the process specific files for security threats prior to the loading of the process specific files; and
removing the security threats in the list of files but not removing any process specific files in the list of files.

2. The method of claim 1, further comprising:
acting on the new process according to a result of the examination.

3. The method of claim 2, further comprising:
terminating the new process based on the examination of the process specific files.

4. The method of claim 2, the acting on the new process including generating an alert.

5. The method of claim 2, the acting on the new process further comprising:
inserting one or more Application Program Interface (API) hooks to monitor calls made by the process specific files.

6. The method of claim 2, the examining of the process specific files further comprising:
determining which process specific files are loaded statically.

7. The method of claim 1, the copied new file being a dynamic link library.

8. The method of claim 1, where the copied new file is perceived by the loader as statically tied to the new process.

9. An apparatus for inserting code into a process, comprising:
a memory;
a processor coupled to the memory;
an operating system, including:
a loader operable to create one or more processes;
a kernel operable to receive a system call to create a new process; and
a hook module operable to create a kernel hook on the kernel operable to monitor the kernel for incoming system calls, the kernel hook further operable to identify a create process system call to create the new process, wherein upon receipt of the create process system call by the kernel, a loader of the operating system is directed to create the new process comprising:
assembling a list of files to be loaded for the new process, the list of files comprising:
system files common to all processes; and
process specific files specific to the new process;
injecting a new entry into the list of files assembled by the loader to create the new process comprising copying a new file into the list of files such that the copied new file will be loaded prior to loading of the process specific files;
loading the copied new file prior to the loading of the process specific files, wherein upon being loaded, the copied new file is operable to examine the process specific files for security threats prior to the loading of the process specific files; and
removing the security threats in the list of files but not removing any process specific files in the list of files.

10. The apparatus of claim 9, the kernel hook on the kernel monitoring the kernel for the create process system call.

11. A computer program product, tangibly stored on a computer-readable medium, comprising instructions operable to cause a programmable processor to:
apply a hook on a kernel of an operating system;
monitor system calls made to the kernel using the hook;
identify a create process system call to create a new process using the hook, wherein upon receipt of the create process system call by the kernel, a loader of the operating system is directed to create the new process comprising:
assembling a list of files to be loaded for the new process, the list of files comprising:
system files common to all processes; and process specific files specific to the new process;

injecting a new entry into the list of files assembled by the loader to create the new process comprising copying a new file into the list of files such that the copied new file will be loaded prior to loading of the process specific files;

loading the copied new file prior to the loading of the process specific files, wherein upon being loaded, the copied new file is operable to examine the process specific files for security threats prior to the loading of the process specific files; and removing the security threats in the list of files but not removing any process specific files in the list of files.

12. The computer program product of claim 11, further comprising instructions to:

act on the new process according to a result of the examination.

13. The computer program product of claim 12, further comprising instructions to:

terminate the new process based on the examination of the process specific files.

14. The computer program product of claim 12, where the instructions to act on the new process include instructions to generate an alert.

15. The computer program product of claim 12, where the instructions to act on the process further comprise instructions to:

insert one or more Application Program Interface (API) hooks to monitor calls made by the process specific files.

16. The computer program product of claim 12, where the instructions to examine the process specific files further comprise instructions to:

determine which process specific files are loaded statically.

* * * * *